United States Patent [19]

Ozaki

[11] Patent Number: 5,285,897

[45] Date of Patent: Feb. 15, 1994

[54] TAPE CASSETTE CASE

[75] Inventor: Hiroshi Ozaki, Miyagi, Japan

[73] Assignee: Sony Corporation, Tokyo, Japan

[21] Appl. No.: 956,620

[22] Filed: Oct. 5, 1992

[30] Foreign Application Priority Data

Oct. 3, 1991 [JP] Japan ................................. 3-281875

[51] Int. Cl.$^5$ ........................................ B65D 85/672
[52] U.S. Cl. ................................. 206/387; 206/1.5;
206/815; 312/9.52; 220/346
[58] Field of Search ............... 206/387, 307, 309, 815,
206/1.5; 220/345, 346; 312/9.47, 9.48, 9.51,
9.52, 9.53, 9.54, 9.55, 9.56

[56] References Cited

U.S. PATENT DOCUMENTS

| | | | |
|---|---|---|---|
| 4,113,098 | 9/1978 | Howard | 220/345 X |
| 4,573,749 | 3/1986 | Massaro . | |
| 4,615,461 | 10/1986 | Liu | 220/345 X |
| 4,838,422 | 6/1989 | Gregerson . | |
| 4,896,769 | 1/1990 | Merzon | 206/387 X |
| 4,947,989 | 8/1990 | Horton . | |
| 5,011,010 | 4/1991 | Francis et al. | 206/307 |
| 5,011,015 | 4/1991 | Ziegler et al. | 206/387 |
| 5,038,932 | 8/1991 | Sheu | 206/387 |

FOREIGN PATENT DOCUMENTS

| | | |
|---|---|---|
| 0341715 | 2/1978 | Australia . |
| 0081023 | 12/1981 | European Pat. Off. . |
| 3132386 | 8/1981 | Fed. Rep. of Germany . |
| 8531981 | 11/1985 | Fed. Rep. of Germany . |
| 8702124 | 9/1987 | Netherlands . |
| 8300768 | 3/1983 | PCT Int'l Appl. . |

Primary Examiner—Paul T. Sewell
Assistant Examiner—Jacob K. Ackun, Jr.
Attorney, Agent, or Firm—Lewis H. Eslinger; Jay H. Maioli

[57] ABSTRACT

A rectangular tape cassette case for carrying a plurality of tape cassettes has a base member formed with a bottom wall, a front wall, a rear wall and a pair of side walls. A cover member formed with a top wall and a pair of side walls is slidably mounted on the base member in a longitudinal direction of the rectangular tape cassette case. The base member has ribs for separating spaces for each of the tape cassettes to be carried.

5 Claims, 12 Drawing Sheets

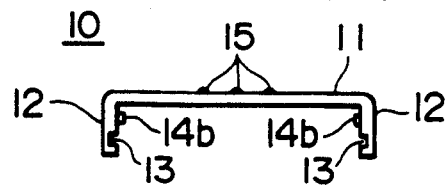
F I G. 3a
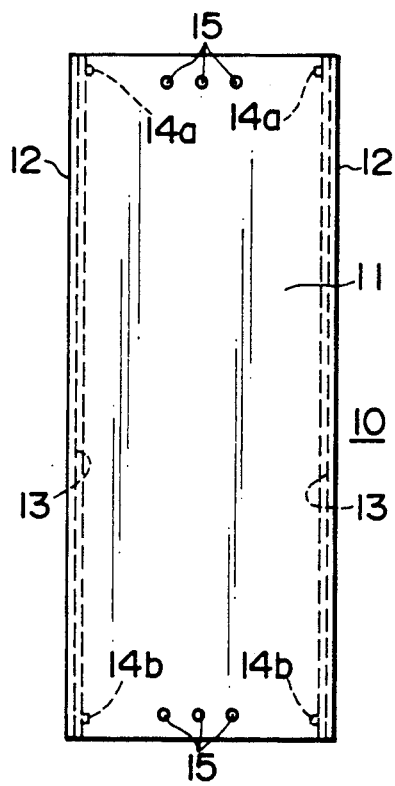
F I G. 3b
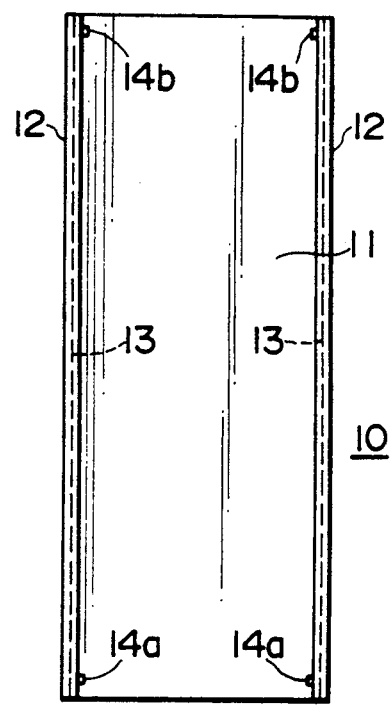
F I G. 3c
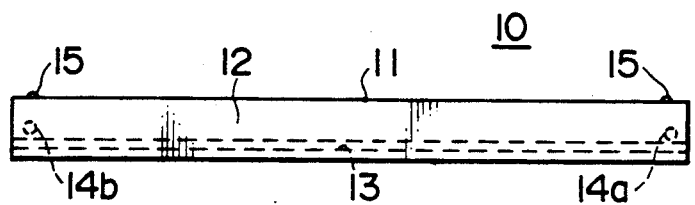
F I G. 3d

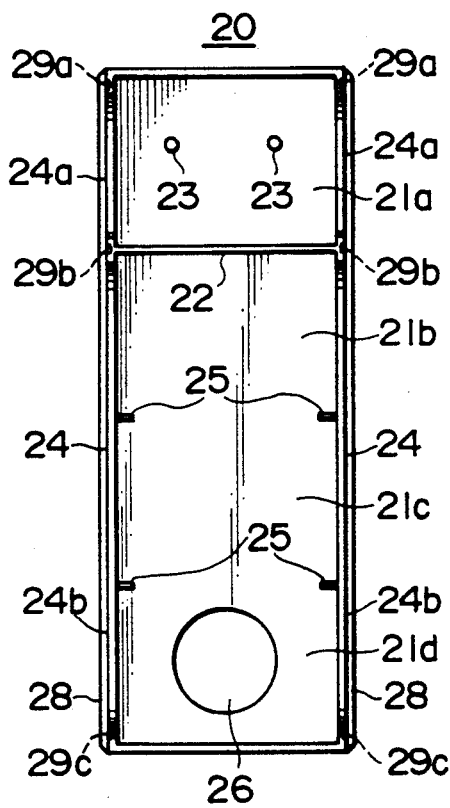
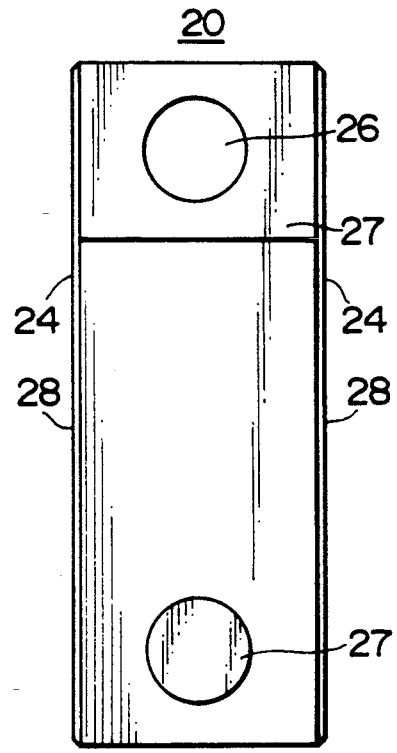
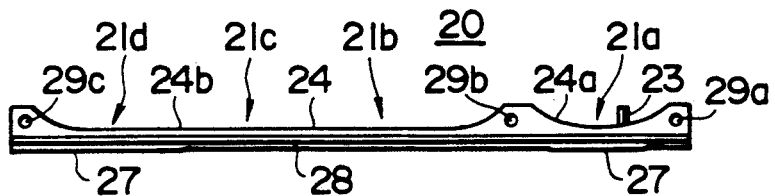

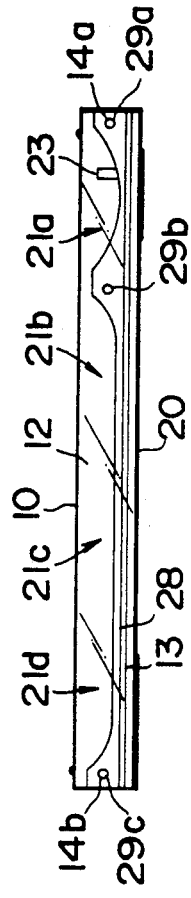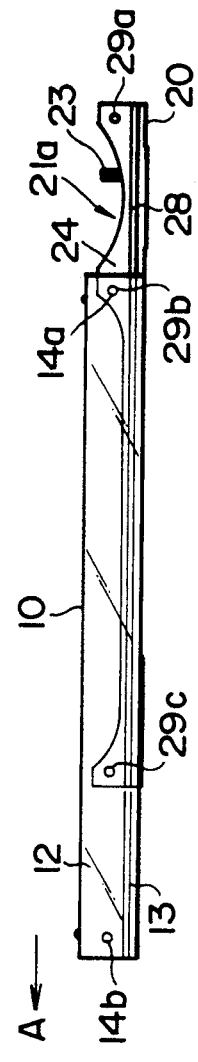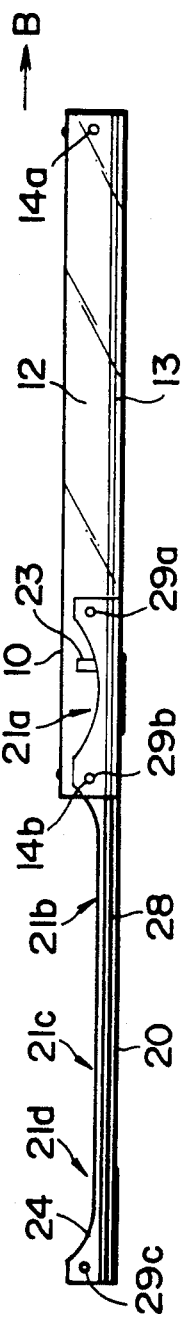
FIG. 5a
FIG. 5b
FIG. 5c

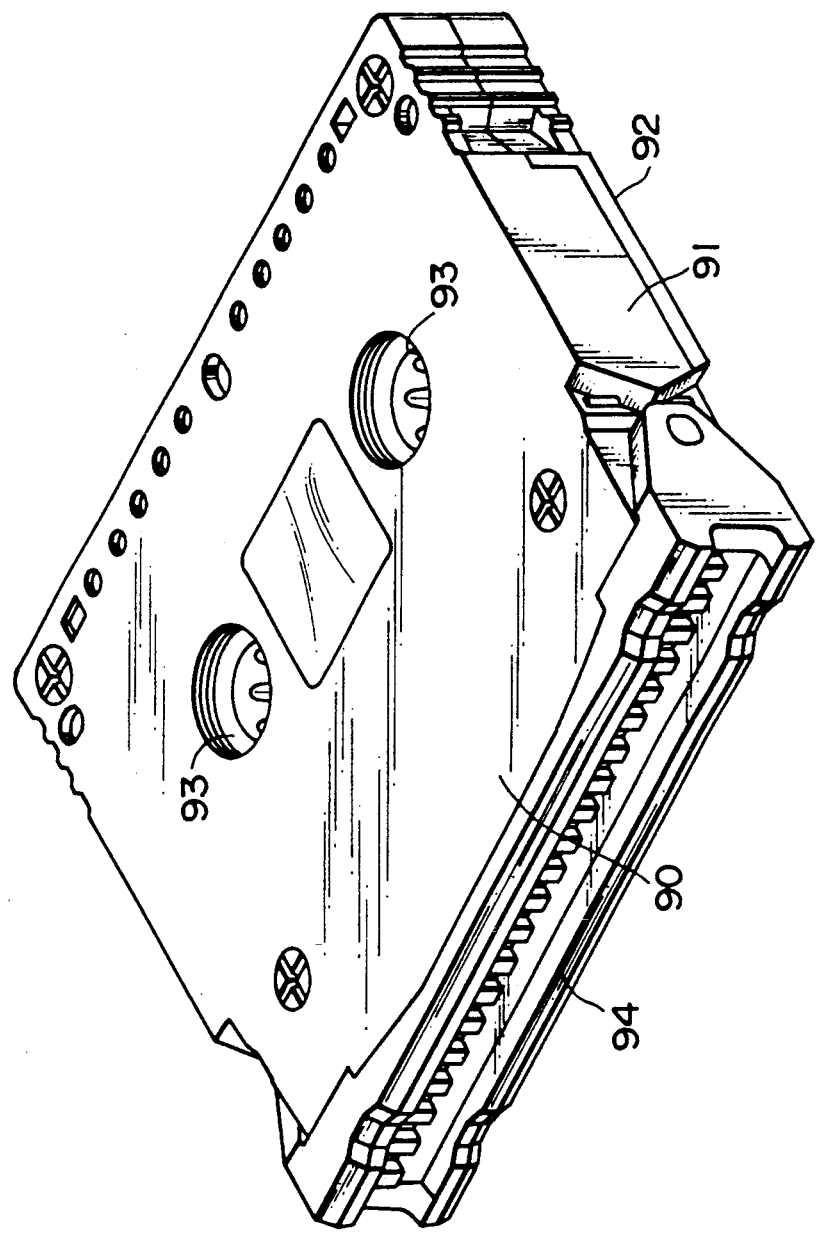

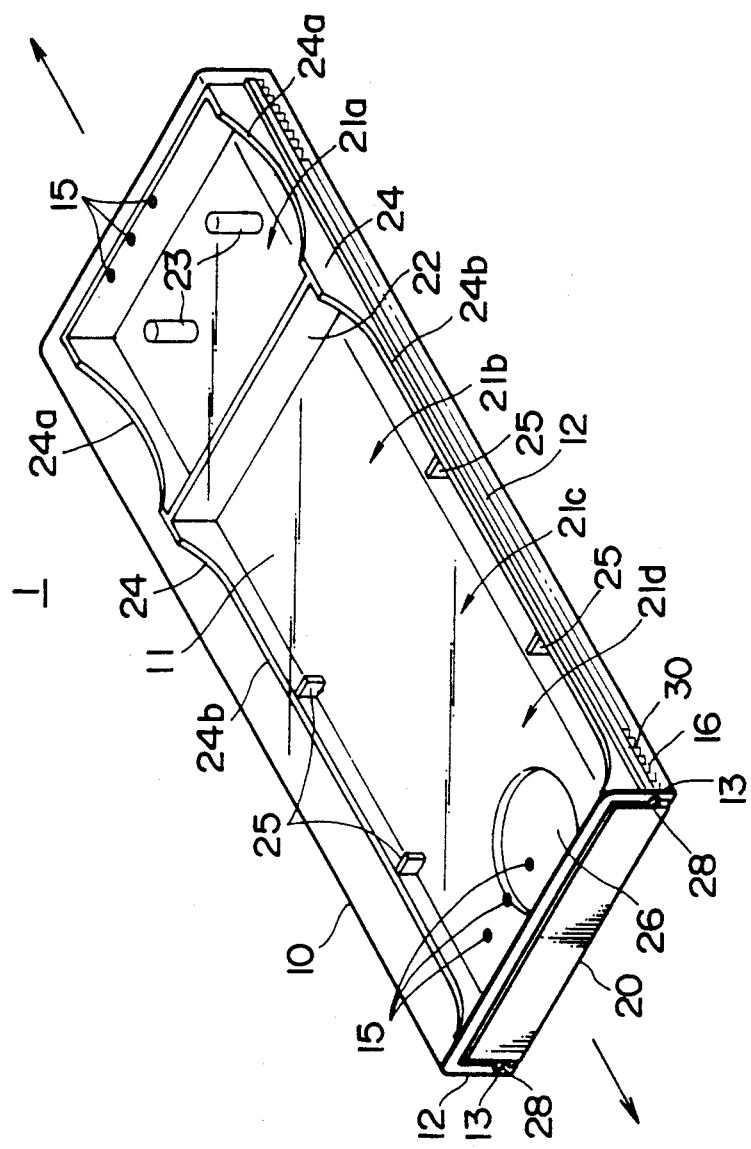

FIG. 9a
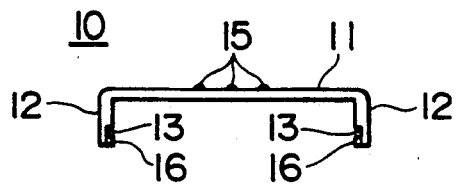
FIG. 9b        FIG. 9c
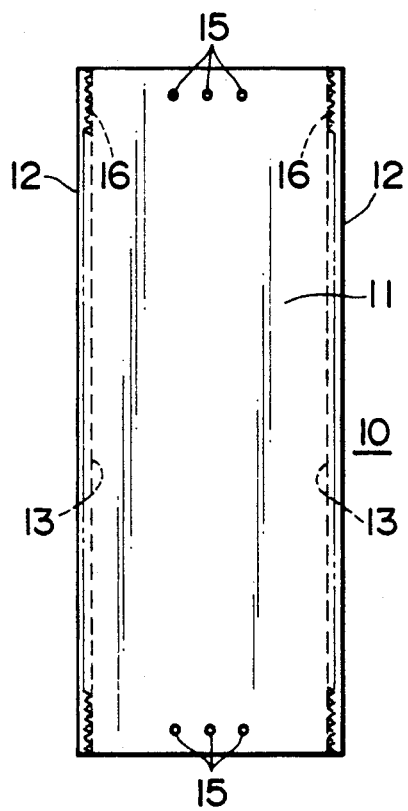    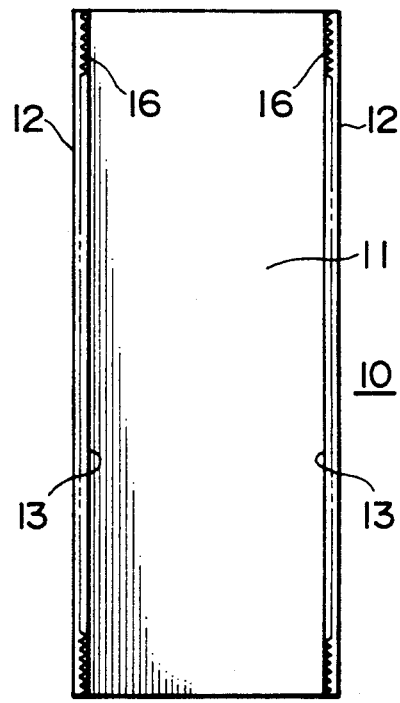
FIG. 9d
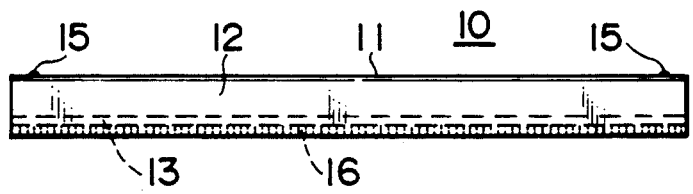

TAPE CASSETTE CASE

BACKGROUND OF THE INVENTION (1) Field of the Invention

This invention relates to a case suitable for carrying tape cassettes each of which encloses a pair of reel hubs with a tape form recording medium wound thereon.

(2) Description of the Prior Art

Tape cassettes such as compact cassettes and DAT (digital audio tape) cassettes are in wide use now. In using such tape cassettes, it is common practice to store or carry each of the tape cassettes in a case which is formed, for example, of plastic.

For very small sized (or micro) tape cassettes which have been developed in recent years, however, it is not always preferable to provide one case for each tape cassette. It is rather convenient, for storing or carrying the micro tape cassettes, to prepare a case which accommodates a predetermined number (e.g., three or four) of the tape cassettes.

Besides, a case having a plurality of storage portions or spaces for each of a plurality of tape cassettes to be carried is required to have such a construction that each of the storage spaces can be set into a suitable position for easy storage and pick-up of the tape cassette.

SUMMARY OF THE INVENTION

It is accordingly an object of this invention to provide a tape cassette case which has a plurality of storage portions and in which each of the storage portions in an opened condition is suitable for easy storage and pick-up of a tape cassette.

According to this invention, there is provided a rectangular tape cassette case for carrying a plurality of tape cassettes, comprising:

a base member having a bottom wall, a front wall, a rear wall and a pair of side walls; and a cover member having a top wall and a pair of side walls, slidably mounted on the base member in a longitudinal direction of the rectangular tape cassette case, wherein the base member has ribs for separating spaces for each of the tape cassettes to be carried.

In the tape cassette case of this invention, in a specific aspect, the side walls of the cover and base members have means for engagement with each other so as to achieve click stops for slidable movement of the cover member on the base member. In another specific aspect, the engaging means comprise saw-tooth like-shaped portions extending uninterruptedly in the sliding direction, namely, in the longitudinal direction of the tape cassette case. In a further specific aspect, the side walls of the base member have cutout portions for easy pick-up of tape cassettes from the base member.

The tape cassette case according to this invention, constructed as above, ensure that each of the storage spaces can be set into a suitable position for easy storage and pick-up of the tape cassette, while preventing easy sliding of the cover member on the base member The above and other objects, features and advantages of this invention will become apparent from the following description and appended claims, taken in conjunction with the accompanying drawings.

BRIEF DESCRIPTION OF THE DRAWINGS

FIGS. 3a to 3d show respectively a front view, a top plan view, a bottom plan view and a side view of the cover member in the first embodiment;

FIGS. 4a to 4d show respectively a front view, a top plan view, a bottom plan view and a side view of a base member in the first embodiment;

FIG. 5a to 5c illustrate various click stops for slidable movement of the cover member in the first embodiment;

FIG. 6 is a perspective view of a tape cassette to be stored in the embodiment of the tape cassette case according to the invention;

FIG. 7 is a perspective view of a second embodiment of the tape cassette case according to this invention;

FIGS. 9a to 9d show respectively a front view, a top plan view, a bottom plan view and a side view of the cover member in the second embodiment;

DESCRIPTION OF THE PREFERRED EMBODIMENTS

This invention will now be explained more in detail with reference to some preferred embodiments thereof.

A first embodiment of the tape cassette case according to this invention will now be described below with reference to FIGS. 1 to 5. Besides, FIG. 6 shows a perspective view of a tape cassette to be carried in the tape cassette case of this invention, the tape cassette 90 being formed in a very small size, for example, on the order of 30 mm $\times$ 20 mm $\times$ 5 mm. The tape cassette 90 has upper and lower cassette-halves 91 and 92 fitted to each other to form a casing, in which are encased a pair of reel hubs 93 with a magnetic tape wound thereon. A portion of the magnetic tape, led out to the front side of the casing between the reel hubs 93 by an internal tape path mechanism, is normally covered by a lid 94 operably mounted on a front face of the casing, as shown in the figure. The tape cassette is described, for example, in US pending application Ser. No. 837,908, filed Feb. 20, 1992.

Figure 1:
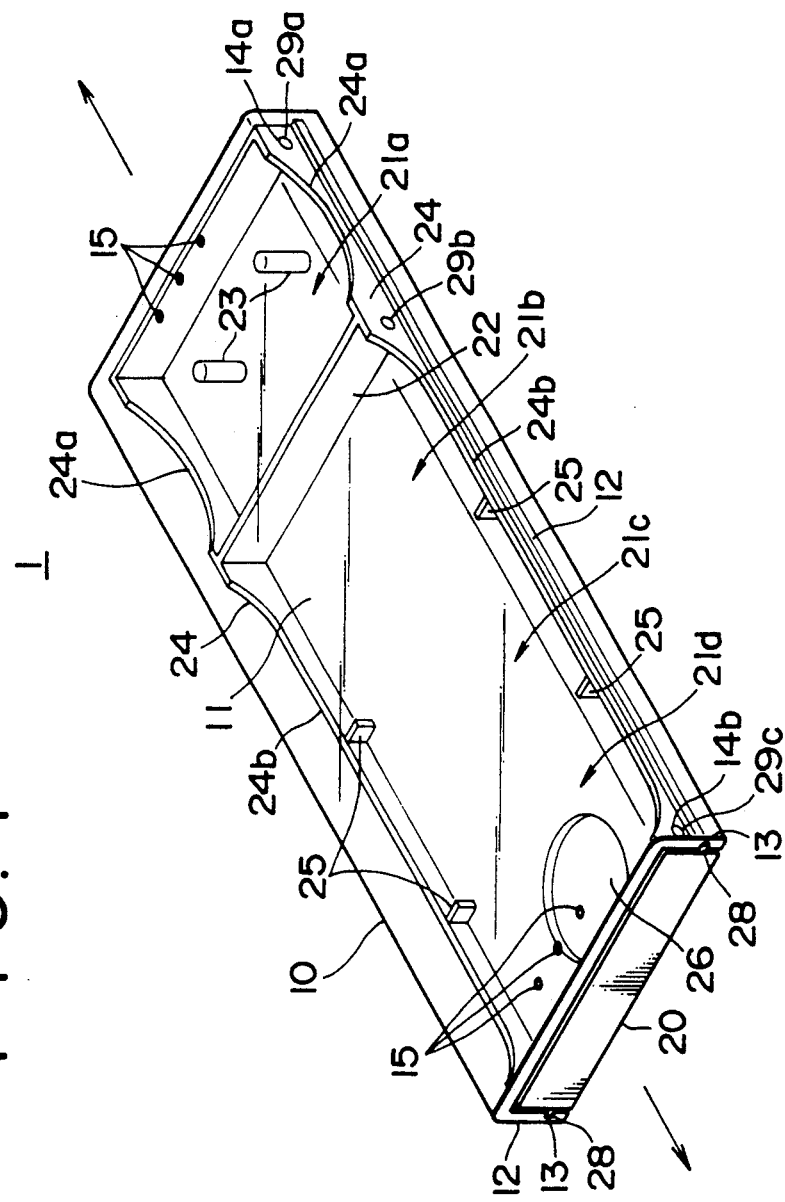
FIG. 1 is a perspective view of a first embodiment of the tape cassette case according to this invention.
Figure 2:
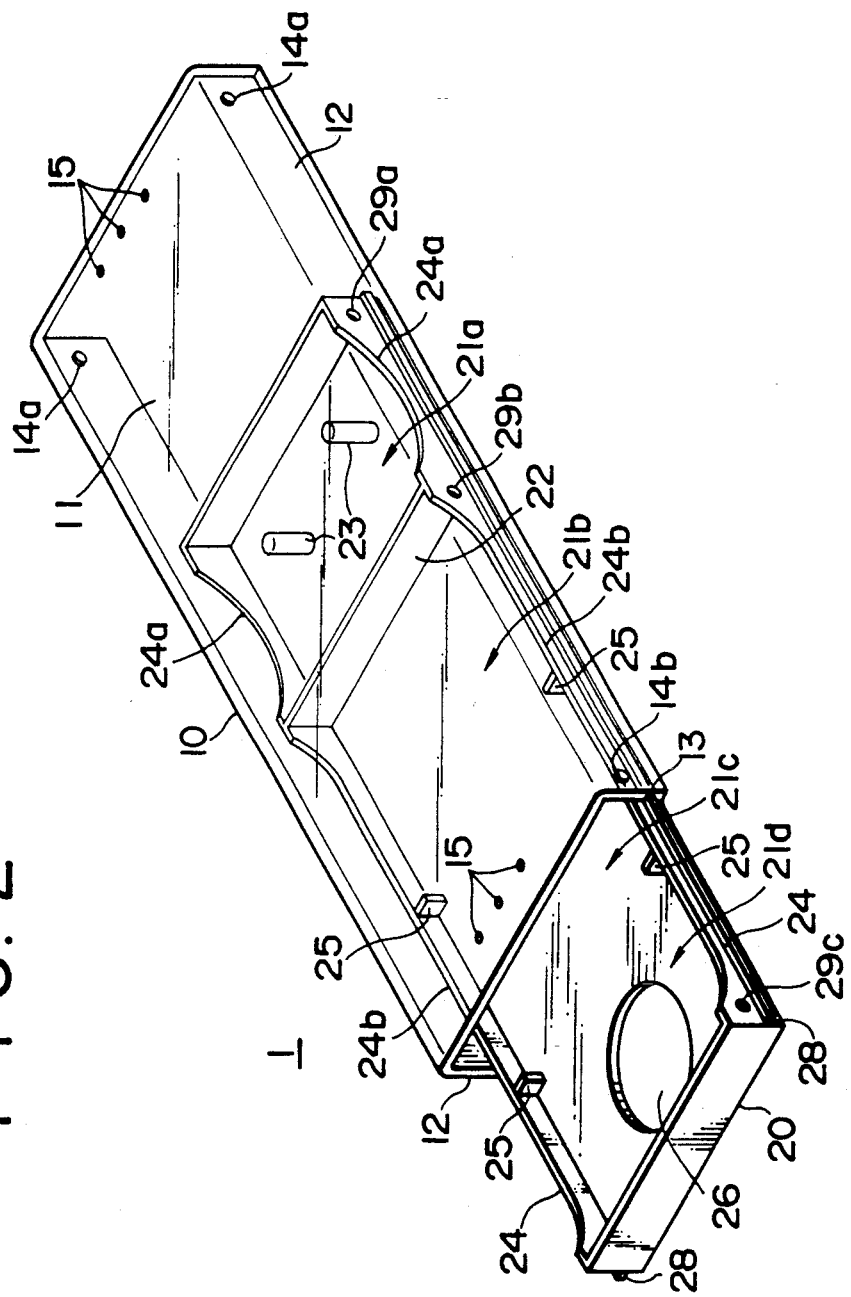
FIG. 2 is a perspective view showing the tape cassette case of the first embodiment, with a cover member in a slid condition.

FIG. 1 is a perspective view of a tape cassette case 1 capable of carrying four such tape cassettes 90 therein, and FIG. 2 is a perspective view showing the tape cassette case 1 with its cover member partially slid back. The case 1 comprises the cover member 10 and a base member 20. FIGS. 3a, 3b, 3c and 3d respectively show a front view, a top plan view, a bottom plan view and a right side view of the cover member 10, while FIGS. 4a, 4b, 4c and 4d respectively show a front view, a top plan view, a bottom plan view and a right side view of the base member 20. For each of the cover member 10 and the base member 20, a rear view and a left side view are identical or symmetrical with the front view and the right side view, respectively.

As seen from these figures, the base member 20 comprises four storage portions or spaces 21a, 21b, 21c and 21d for containing one tape cassette 90 each, and an internal wall portion 22 for partition between the storage portions 21a and 21b. The storage portion 21a is provided on its inner bottom surface with a pair of projections 23 to be engaged with into the reel hubs 93 of the tape cassette 90 for guiding of the tape cassette 90 to the storage position.

The storage portions 21b, 21c and 21d are separated only by ribs 25 adjunct to side walls 24, but the tape cassettes 90 are kept stored appropriately in each of the storage portions 21b, 21c and 21d by contact with the ribs 25.

Each of the side walls 24 comprises a curved cutout portion 24a corresponding to the storage portion 21a, and a curved cutout portion 24b corresponding to the storage portions 21b to 21d as a whole. The cutout portions 24a and 24b provided in the side walls 24 ensure easy pick-up of the tape cassettes 90 out of the storage portions 21a to 21d.

The storage portion 21d has a circular hole 26 formed at a bottom portion thereof, and the base member 20 is provided on its bottom side with an anti-slip portion 27 having a rugged surface.

Further, each of the side walls 24 of the base member 20 is provided with a rail 28 extending on the outer surface and over the entire length thereof, and with dents 29a, 29b and 29c in its outer surface at positions other than the cutout portions 24a, 24b.

On the other hand, the cover member 10, mounted on the base member 20 slidably and detachably, comprises a top wall 11 and a pair of side walls 12 so as to be roughly U-shaped in cross section, and is molded from a transparent plastic. The top wall of the cover member 10 is sized to cover entirely the storage potions 21a to 21d of the base member 20.

Each of the side walls 12 of the cover member 10 is provided with a groove 13 in the inner surface and along the entire length thereof. The cover member 10 is mounted on the base member 20, with the rails 28 on the base member 20 fitted in the grooves 13 of the cover member 10, as shown in FIG. 1. Therefore, the cover member 10 can be slid relative to the base member 20 in the direction as indicated in FIG. 2 or in the opposite direction. The sliding motions enable the storage portions 21a to 21d of the base member 20 to be opened and closed on the upper side.

The side walls 12 of the cover member 10 have projections 14a, 14b on the inner side thereof. The projections 14a, 14b are so positioned and shaped as to fit in the dents 29a, 29c of the base member 20 when the tape cassette case 1 is closed as shown in FIG. 1.

In addition, a predetermined number of projections 15 are provided on the flat surface of the top wall 11 of the cover member 10. The projections 15 ensure that when, for example, a plurality of tape cassette cases 1 according to this embodiment are stacked, the surface of the cover member 10 of an underlying case 1 does not make scratching contact with the bottom surface of the base member 20 of an overlying case 1. Thus, the cover member 10 is protected from being marred or stained.

In the tape cassette case 1 as above, sliding the cover member 10 in a desired amount and direction relative to the base member 20 opens one or more of the storage portions 21a to 21d, to enable very easy storage and pick-up of tape cassettes 90. Furthermore, the case 1 according to this embodiment, designed for storing four micro tape cassettes 90, has a suitable size for use (on the order of 35×90×7 mm) and is convenient for putting the tape cassettes 90 in order or for carrying the tape cassettes 90.

In particular, according to this embodiment, the projections 14a and 14b provided on the cover member 10 and the dents 29a, 29b and 29c provided in the base member 20 offer a better convenience in use.

That is, when the storage portions 21a to 21d are wholly closed by the cover member 10, the projections 14a and 14b are fitted respectively in the dents 29a and 29c, as shown in FIG. 5a, thereby keeping the closed condition. This prevents unintentional sliding of the cover member 10, which would result, for example, in flying-out or falling-off of the tape cassettes 90 stored in the tape cassette case 1.

When it is desired to open only the storage portion 21a, for example, the cover member 10 is slid in the direction of arrow A, as shown in FIG. 5b. Then, a click stop for slidable movement of the cover member 10 on the base member 20 is achieved at the position where the projection 14a of the cover member 10 is fitted in the dent portion 29b of the base member 20. Namely, an optimum opening for the storage portion 21a is attained.

When it is desired to open the storage portions 21b to 21d, on the other hand, the cover member 10 is slid in the direction of arrow B, as shown in Figure 5c. This causes a click stop in the slidable movement of the cover member 10 on the base member 20 at the position where the projection 14b of the cover member 10 is fitted in the dent portion 29b of the base member 20. Thus, an optimum opening for the storage portions 21b to 21d is achieved.

Because the cover member 10 can thus be set into and maintained in a desired opened condition, the tape cassettes 90 can be stored and picked up easily. In addition, the cover member 10 will not be opened to such a large extent as to come off or become hard to deal with. Further, unintentional fall-off of the stored tape cassette 90 or the like troubles are obviated.

Besides, according to this embodiment as described above, the storage portions 21b to 21d are not separated from each other by internal walls or the like. This construction ensures that in use of the tape cassette case 1 for sale of the tape cassette 90, the storage portion 21a may be used to store the tape cassette 90 while the storage portions 21a to 21d may be used for other purpose, for instance, for storing a paper mount printed with the trade name, trademark or the like of the tape cassette 90. In such instance, the hole 26 serves for easy pick-up of the paper mount or the like.

The tape cassette case according to this embodiment may, of course, be provided with inner walls for separation of the storage portions 21b to 21d from each other and further with dents in the side walls 24 at positions corresponding to the inner walls, whereby a greater number of click stops can be achieved for slidable movement of the cover member 10 on the base member 20.

The projections and dents may be formed on the rails 28 and grooves 13 or may be formed below the rails 28 and grooves 13.

Besides, the cover member 10 may have dents and the base member 20 may have projections. Furthermore, either or both of the dents and the projections may be provided in a greater number than the above-described.

In the next place, a second embodiment of the tape cassette case according to this invention will be described below with reference to FIGS. 7 to 14. The components identical with those shown in FIGS. 1 to 5 above are denoted by the same reference characters as used in FIGS. 1 to 5, and explanation of such components will be omitted.

Figure 8:
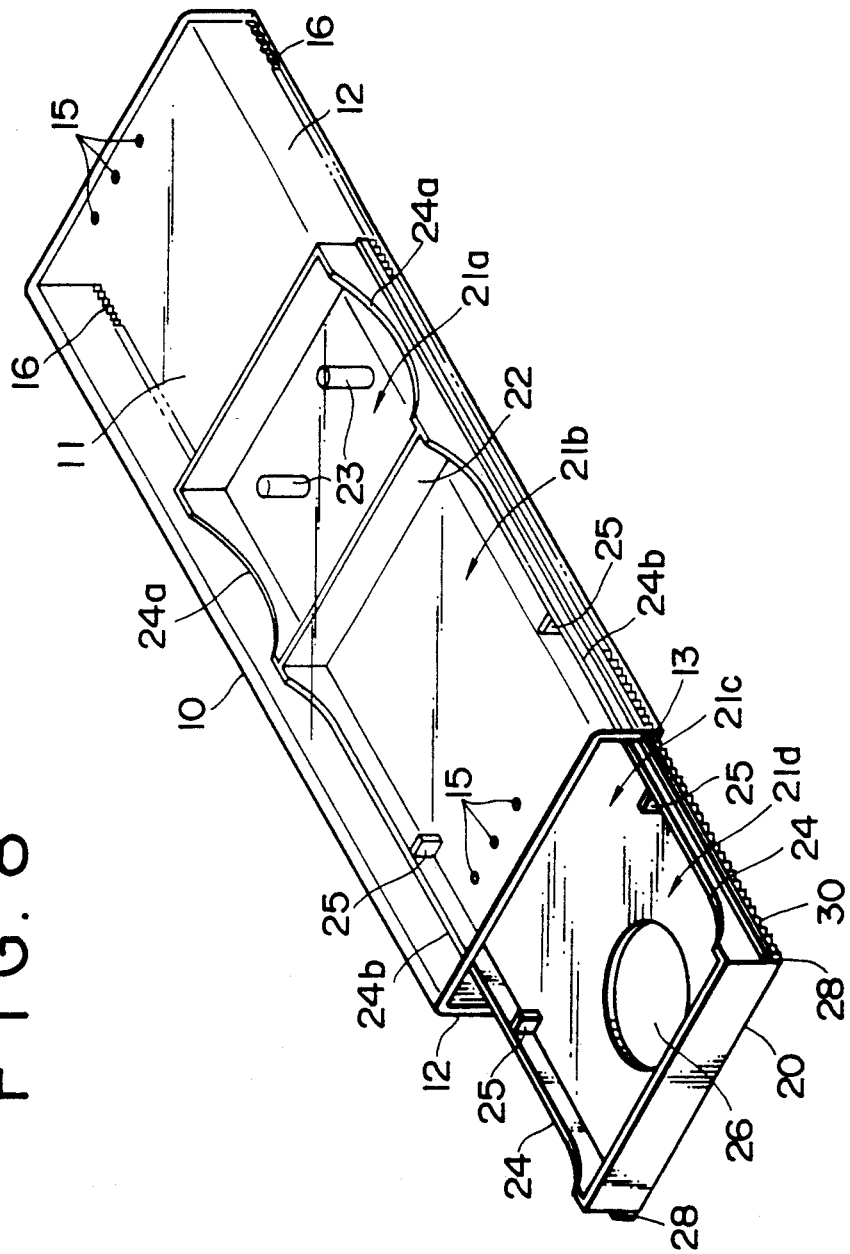
FIG. 8 is a perspective view showing the tape cassette case of the second embodiment, with a cover member in a slid condition.
Figure 10A:
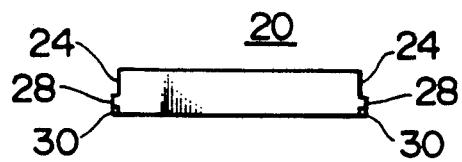
FIGS. 10a to 10d show respectively a front view, a top plan view, a bottom plan view and a side view of a base member in the second embodiment.
Figure 10B:
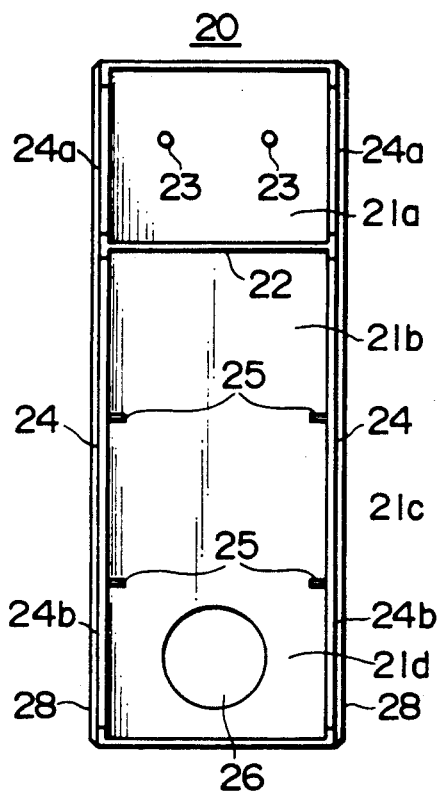
Figure 10C:
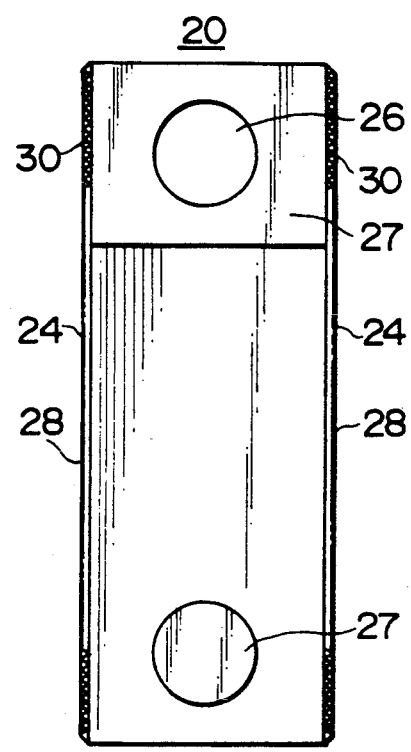
Figure 10D:
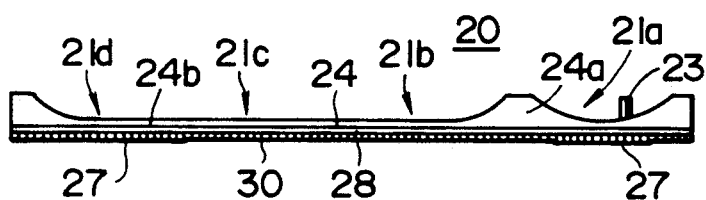

FIG. 7 is a perspective view of a tape cassette case 1 according to the second embodiment, and FIG. 8 is a perspective view showing the case 1 with a cover member 10 partially slid back. FIGS. 9a, 9b, 9c and 9d respectively show a front view, a top plan view, a bottom plan view and a right side view of the cover member 10, and FIGS. 10a, 10b, 10c and 10d respectively show a front view, a top plan view, a bottom plan view and a right side view of a base member 20.

In this embodiment, the base member 20 does not have the dents 29a to 29c as appearing in the above first embodiment. Instead, side walls 24 of the base member 20 have saw-tooth like-shaped portions 30 extending uninterruptedly along the entire length of the side walls 24, below rails 28 on the side walls 24. Similarly, the cover member 10 does not have the projections 14a, 14b as appearing in the above first embodiment; instead, side walls 12 of the cover member 10 have saw-tooth like shaped portions 16 extending uninterruptedly along the entire length of the side walls 12, below grooves 13 formed in the inner surfaces of the side walls 12.

Figure 11:
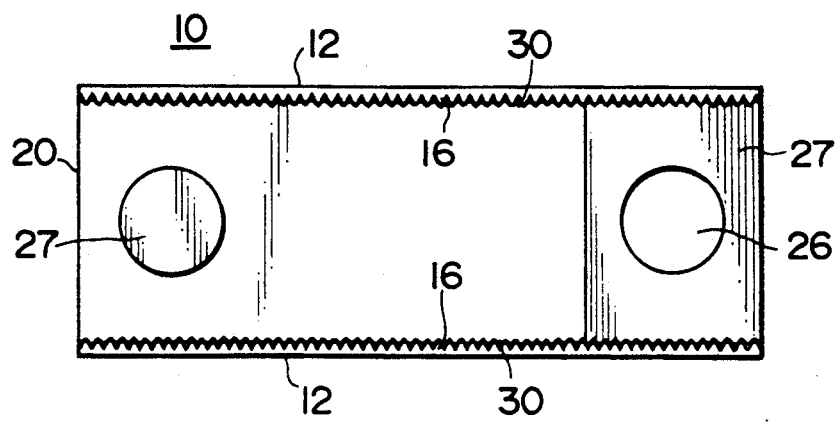
FIG. 11 is a bottom plan view of the second embodiment.
Figure 12A:
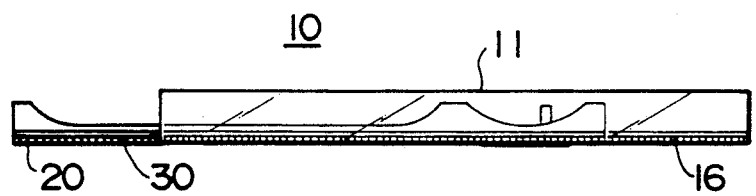
FIG. 12a to 12c illustrate various click stops for slidable movement of the cover member in the second embodiment.
Figure 12B:
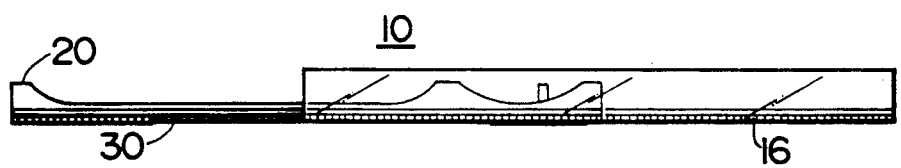
Figure 12C:
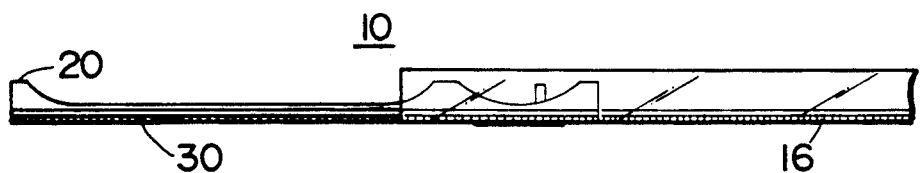

As seen in FIG. 11, which shows a bottom plan view of the tape cassette case 1 with the cover member 10 in the closed condition as illustrated in FIG. 7, the saw-tooth like-shaped portions 16 of the cover member 10 are just in gentle engagement with the saw-tooth like-shaped portions 30 of the base portion 20. The engagement prevents the cover member 10 from unintended sliding.

Because the saw-tooth like-shaped portions 16 and 30 extend uninterruptedly in the longitudinal direction of the tape cassette case 1, the degree of opening (or slide amount) of the cover member 10 can be set as desired, with a greater number of click stops for slidable movement of the cover member 10 on the base member 20 than in the above first embodiment. This ensures a higher convenience in use of the tape cassette case, and easier storage and pick-up of tape cassettes from the storage portions 21a–21d.

The click stops for slidable movement of the cover member 10 provided by the engagement between the uninterruptedly extending saw-tooth like-shaped portions 16 and 30 offer a sufficiently firm hold for preventing an unintentional detachment of the cover member 10, a sliding movement of the cover member 10 due to a shock upon fall of the tape cassette case, etc. Thus, the storing and protective function for tape cassettes 90 is improved.

Figure 13:
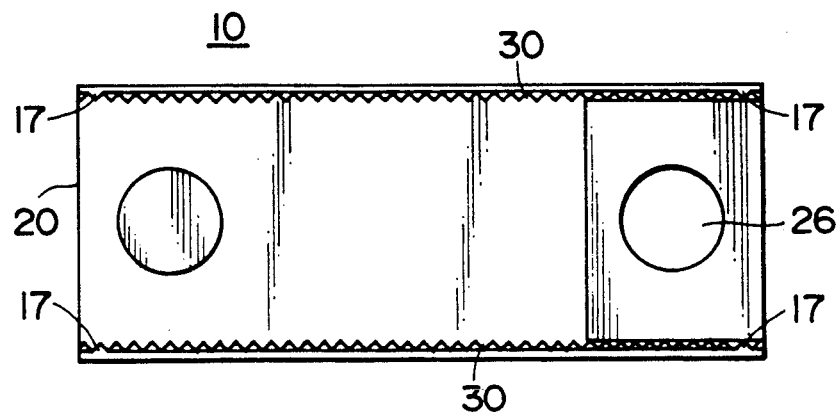
FIG. 13 is a bottom plan view showing a modification of the second embodiment.

In this embodiment as described above, the uninterrupted saw-tooth like-shaped portions are provided on both the cover member 10 and the base member 20. However, an alternative construction as shown in FIG. 13 may be adopted, in which at least one of the cover and base members, for example, the base member 20 has the uninterrupted saw-tooth like-shaped portions 30, while the other of the cover and base members, namely, the cover member 10 has one or more projections 17 for engagement with the saw-tooth like-shaped portion 30.

Figure 14A:
FIG. 14 consisting of FIGS. 14a, 14b and 14c, illustrates modifications of portions for engagement to prevent unintentional sliding of the cover member in the second embodiment.
Figure 14B:
Figure 14C:

Also, the uninterruptedly extending portions for preventing unintended sliding of the cover member 10 are not limited to the saw-tooth like-shaped ones as shown in FIG. 14a, and may be circularly shaped ones as shown in FIG. 14b, trapezoid-shaped ones as shown in FIG. 14c, or the like.

The position of the uninterruptedly extending portion is not limited to the above-described, but may be, for example, on the rails 28 of the base portion 20 and in the grooves 13 of the cover member 10.

Various modifications may be made as to the shape of the tape cassette case, the number of tape cassettes to be carried, etc. within the scope of this invention. Furthermore, the tape cassette case according to the invention is not limited to cases for micro tape cassettes but is applicable to cases for any type of tape cassettes.

As has been described above, the tape cassette case according to this invention has a plurality of storage portions, and comprises a base member and a cover member which have means for engagement to achieve click stops for slidable movement of the cover member on the base member. In the tape cassette case, therefore, the storage portions can be set into an open position convenient for intended storage or pick-up of tape cassettes, and the cover member can be prevented from unintentional sliding or coming-off. The tape cassette case of this invention is convenient for storing tape cassettes in order and carrying the tape cassettes, and is particularly useful as a case for micro tape cassettes.

What is claimed is:

1. A rectangular tape cassette case for carrying a plurality of tape cassettes, said case comprising:
    a base member formed with a bottom wall, a front wall, a rear wall and a pair of side walls; and
    a cover member formed with a top wall and a pair of side walls, slidably mounted on said base member in a longitudinal direction of the rectangular tape cassette case, wherein
    said base member is further formed with at least one pair of ribs partially projecting into said base member respectively from each of said pair of side walls defining a plurality of separate spaces for respectively accommodating each of said tape cassettes to be carried, wherein each of said side walls of said base member has a guide rail extending in the longitudinal direction of the tape cassette case near the bottom wall of said base member and each of said side walls of said cover member has a guide groove corresponding to said guide rail of said base member and engageable therewith for slidably guiding said cover member on said base member and wherein said side walls of the base member have a plurality of indented portions, and wherein said side walls of the cover member have a plurality of projections corresponding to said indented portions and engageable therewith in order to form a plurality of click stops, said click stops comprising means for arresting slidable movement of said cover member on said base member at respective different positions.

2. A rectangular tape cassette case as recited in claim 1 wherein said side walls of the base member have cut-out portions in order to facilitate manually picking up tape cassettes from said base member.

3. A rectangular tape cassette case as recited in claim 1 wherein said cover member is molded of transparent plastic.

4. A rectangular tape cassette case for carrying a plurality of tape cassettes, said case comprising:
- a base member formed with a bottom wall, a front wall, a rear wall and a pair of side walls; and
- a cover member formed with a top wall and a pair of side walls, slidably mounted on said base member in a longitudinal direction of the rectangular tape cassette case, wherein
- said base member is further formed with at least one pair of ribs defining a plurality of separate spaces for respectively accommodating each of said tape cassettes to be carried and wherein each of said side walls of said base member has a guide rail extending in the longitudinal direction of the tape cassette case near the bottom wall of said base member, and each of said side walls of said cover member has a guide groove corresponding to said guide rail of said base member and engageable therewith for slidably guiding said cover member on said base member; wherein
- said side walls of the base member have sawtooth portions extending in the longitudinal direction of said tape cassette case, and at least one projection is provided on said side walls of the cover member in facing relation to said sawtooth portions in order to control an ease of sliding of said cover member on said base member.

5. A rectangular tape cassette case for carrying a plurality of tape cassettes, said case comprising:
- a base member formed with a bottom wall, a front wall, a rear wall and a pair of side walls; and
- a cover member formed with a top wall and a pair of side walls, slidably mounted on said base member in a longitudinal direction of the rectangular tape cassette case, wherein
- said base member is further formed with at least one pair of ribs defining a plurality of separate spaces for respectively accommodating each of said tape cassettes to be carried and wherein each of said side walls of said base member has a guide rail extending in the longitudinal direction of the tape cassette case near the bottom wall of said base member, and each of said side walls of said cover member has a guide groove corresponding to said guide rail of said base member and engageable therewith for slidably guiding said cover member on said base member; wherein
- both said side walls of the base member and said side walls of the cover member have sawtooth portions in facing relation to each other and extending in the longitudinal direction of the tape cassette case for controlling an ease of sliding of said cover member on said base member.

* * * * *